United States Patent [19]

Kamada et al.

[11] Patent Number: 5,099,340
[45] Date of Patent: Mar. 24, 1992

[54] ELECTRONIC FILING APPARATUS

[75] Inventors: Hiroshi Kamada; Sumio Kita, both of Nara, Japan

[73] Assignee: Sharp Kabushiki Kaisha, Osaka, Japan

[21] Appl. No.: 520,196

[22] Filed: May 9, 1990

[30] Foreign Application Priority Data

May 15, 1989 [JP] Japan ................................ 1-121801
Sep. 26, 1989 [JP] Japan ................................ 1-250334

[51] Int. Cl.⁵ .......................................... H04N 1/00
[52] U.S. Cl. .................................. 358/403; 358/402; 358/407; 358/434; 358/440; 382/56
[58] Field of Search ............... 358/402, 403, 434, 440, 358/407, 102; 382/56

[56] References Cited

U.S. PATENT DOCUMENTS

| | | | |
|---|---|---|---|
| 4,670,791 | 6/1987 | Murata et al. | 358/441 |
| 4,686,704 | 8/1987 | Kamada et al. | 235/440 |
| 4,797,946 | 1/1989 | Katsuta et al. | 235/375 |
| 4,918,722 | 4/1990 | Duehren et al. | 358/403 |

Primary Examiner—Joseph A. Orsino
Assistant Examiner—Dov Popovici
Attorney, Agent, or Firm—Nixon & Vanderhye

[57] ABSTRACT

An electronic filing apparatus includes a determinating device for receiving an image signal to determine whether or not image represented by the image signal is image of an OMR sheet in accordance with a predetermined form. The form at least includes a field to fill in with a facsimile number and a field to fill in with data designating information for designating desired data. The electronic filing apparatus further includes a recognizing device for recognizing a facsimile number and data designating information from the image signal determined by the determining device as a signal representing the image of the OMR sheet, and an information delivering device for preparing data designated by the recognized data designating information and for transmitting the image signal of the prepared data to the output destination designated by the recognized facsimile number. By entering necessary information in the field of facsimile numbers and the field of data designating information of the OMR sheet, converting the same into an image signal and then applying the converted image signal to the determining device, preparation of the designated information and process of transmitting the prepared information by means of the facsimile device are automatically performed as a series of processes by the electronic filing apparatus.

13 Claims, 8 Drawing Sheets

FIG.2

| PROCESS | REGISTRATION DATE | VALID MONTHS |
|---|---|---|
| [ ] 1 | [ ]0 [ ]0 [ ]0 [ ]0 [ ]0 [ ]0 [ ]0 [ ]0 | [ ]0 [ ]0 [ ]0 |
| [ ] 2 | [ ]1 [ ]1 [ ]1 [ ]1 [ ]1 [ ]1 [ ]1 [ ]1 | [ ]1 [ ]1 [ ]1 |
| 1.REG. | [ ]2 [ ]2 [ ]2 [ ]2 [ ]2 [ ]2 [ ]2 [ ]2 | [ ]2 [ ]2 [ ]2 |
| 2.SEAR. | [ ]3 [ ]3 [ ]3 [ ]3 [ ]3 [ ]3 [ ]3 [ ]3 | [ ]3 [ ]3 [ ]3 |
|  | [ ]4 [ ]4 [ ]4 [ ]4 [ ]4 [ ]4 [ ]4 [ ]4 | [ ]4 [ ]4 [ ]4 |
|  | [ ]5 [ ]5 [ ]5 [ ]5 [ ]5 [ ]5 [ ]5 [ ]5 | [ ]5 [ ]5 [ ]5 |
|  | [ ]6 [ ]6 [ ]6 [ ]6 [ ]6 [ ]6 [ ]6 [ ]6 | [ ]6 [ ]6 [ ]6 |
|  | [ ]7 [ ]7 [ ]7 [ ]7 [ ]7 [ ]7 [ ]7 [ ]7 | [ ]7 [ ]7 [ ]7 |
|  | [ ]8 [ ]8 [ ]8 [ ]8 [ ]8 [ ]8 [ ]8 [ ]8 | [ ]8 [ ]8 [ ]8 |
|  | [ ]9 [ ]9 [ ]9 [ ]9 [ ]9 [ ]9 [ ]9 [ ]9 | [ ]9 [ ]9 [ ]9 |

| DOCUMENT No. | FACSIMILE NUMBER |
|---|---|
| [ ]0 [ ]0 [ ]0 | [ ]0 [ ]0 [ ]0 [ ]0 [ ]0 [ ]0 [ ]0 [ ]0 [ ]0 [ ]0 |
| [ ]1 [ ]1 [ ]1 | [ ]1 [ ]1 [ ]1 [ ]1 [ ]1 [ ]1 [ ]1 [ ]1 [ ]1 [ ]1 |
| [ ]2 [ ]2 [ ]2 | [ ]2 [ ]2 [ ]2 [ ]2 [ ]2 [ ]2 [ ]2 [ ]2 [ ]2 [ ]2 |
| [ ]3 [ ]3 [ ]3 | [ ]3 [ ]3 [ ]3 [ ]3 [ ]3 [ ]3 [ ]3 [ ]3 [ ]3 [ ]3 |
| [ ]4 [ ]4 [ ]4 | [ ]4 [ ]4 [ ]4 [ ]4 [ ]4 [ ]4 [ ]4 [ ]4 [ ]4 [ ]4 |
| [ ]5 [ ]5 [ ]5 | [ ]5 [ ]5 [ ]5 [ ]5 [ ]5 [ ]5 [ ]5 [ ]5 [ ]5 [ ]5 |
| [ ]6 [ ]6 [ ]6 | [ ]6 [ ]6 [ ]6 [ ]6 [ ]6 [ ]6 [ ]6 [ ]6 [ ]6 [ ]6 |
| [ ]7 [ ]7 [ ]7 | [ ]7 [ ]7 [ ]7 [ ]7 [ ]7 [ ]7 [ ]7 [ ]7 [ ]7 [ ]7 |
| [ ]8 [ ]8 [ ]8 | [ ]8 [ ]8 [ ]8 [ ]8 [ ]8 [ ]8 [ ]8 [ ]8 [ ]8 [ ]8 |
| [ ]9 [ ]9 [ ]9 | [ ]9 [ ]9 [ ]9 [ ]9 [ ]9 [ ]9 [ ]9 [ ]9 [ ]9 [ ]9 |

| NUM. OF SHEETS | SCANNER MODE | | | |
|---|---|---|---|---|
|  | DENSITY | SIZE | CONTENTS | SIDE |
| [ ]0 [ ]0 [ ]0 | [ ] D | [ ] A4 | [ ] MIX. | [ ] SGL. |
| [ ]1 [ ]1 [ ]1 | [ ] ↑ | [ ] A3 | [ ] CHR. | [ ] DBL. |
| [ ]2 [ ]2 [ ]2 | [ ] N | [ ] B5 | [ ] PHOTO |  |
| [ ]3 [ ]3 [ ]3 | [ ] ↓ | [ ] B4 |  |  |
| [ ]4 [ ]4 [ ]4 | [ ] L |  |  |  |

| KEY-WORDS | | |
|---|---|---|
| [ ]XXXXX | [ ]XX | [ ]XX |
| [ ]XXX | [ ]XX | [ ]XXX |
| [ ]XXXXX | [ ]XX | [ ]XXX |
| [ ]XXX |  |  |
| [ ]XXXX | [ ]XXX | [ ]XXX |
| [ ]XXXX |  | [ ]XXX |
| [ ]XXXX |  |  |

Y ↑ → X

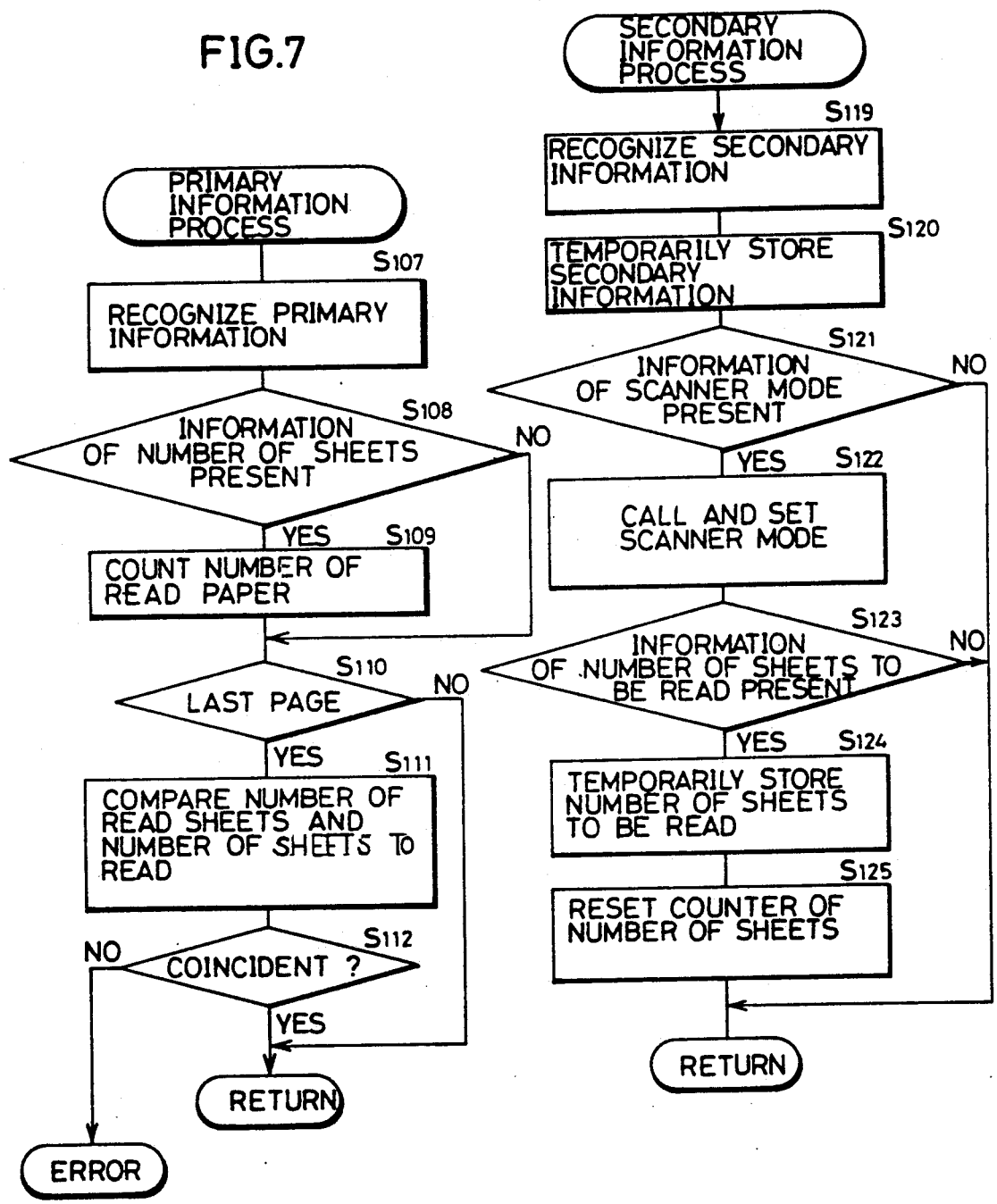

ELECTRONIC FILING APPARATUS

BACKGROUND OF THE INVENTION

1. Field of the Invention

The present invention relates generally to electronic filing apparatus, and more particularly, to an electronic filing apparatus for storing a large amount of image information of documents and providing the same by request.

2. Description of the Related Art

Conventionally, major part of the information generated or gathered in an office is printed on paper and becomes documents. The information is managed by filing the documents. However, recent progress in electronic recording techniques such as optical discs has made it easy to electronically store various types of information.

One example of such device is an electronic filing apparatus. The electronic filing apparatus includes a scanner as reading means. The scanner optically reads image of documents. The image read by the scanner is stored on a magnetic medium such as an optical disc. The electronic filing apparatus makes it possible to retrieve desired information by means of a predetermined outputting means at any time by searching the recording medium.

However, a conventional electronic filing apparatus has the following problems. For example, in case a user needs registered data when he is outside of his office, the user should carry out the following procedures. First, the user calls an operator on the telephone. The user explains to the operator conditions of searching the required data or the like information. The operator searches a storage device of the electronic filing apparatus based on specified conditions. The user receives the result of the search in the form of facsimile transmitted by the operator.

Conventionally, in using an electronic filing apparatus in a distant place, it is necessary to have an operator at the device, as described above. Besides, it is also necessary to orally give the operator the information of the required data. However, such procedure is difficult to follow and occasionally it is carried out incorrectly. Therefore, the electronic filing apparatus can not be used efficiently.

In addition, a conventional electronic filing apparatus has such problem as follows. In sending facsimile to a given destination simultaneously with the registration of the data in the electronic filing apparatus, an operator should operate the device as follows. Namely, the operator operates a scanner to read the data and registers the same in the electronic filing apparatus. The operator searches the data which is just registered in the electronic filing apparatus. After the search, the operator transmits the data obtained by the search by means of the facsimile device. Therefore, the search requires a lot of time. In addition, the destination should be entered through a keyboard, which bothers the operator.

SUMMARY OF THE INVENTION

Therefore, an object of the present invention is to provide an electronic filing apparatus which can be used efficiently.

Another object of the present invention is to provide an electronic filing apparatus capable of efficiently transferring information to a distant place.

A further object of the present invention is to provide an electronic filing apparatus capable of transferring information to a facsimile device in a distance place and capable of transferring the information through an easy operation as described above.

The above-described objects can be achieved by the electronic filing apparatus including: a determining device for receiving an image signal to determine whether or not image represented by the image signal is image of an OMR sheet in accordance with a predetermined form. The predetermined form at least includes blanks for facsimile numbers and blanks for data designating information for designating desired data. The apparatus according to the present invention further includes a recognizing device for recognizing a facsimile number and data designating information from the image signal determined by the determining device as a signal representing the image of the OMR sheet, and an information delivering device for preparing data designated by the recognized data designating information and transmitting the image signal of the preferred data to an output destination designated by the recognized facsimile number by means of the facsimile device.

According to a preferred embodiment of the present invention, the electronic filing apparatus further includes a facsimile receiving circuit adapted to be connected to a facsimile transmitter through a communication line for receiving an image signal from the facsimile transmitter and for applying the signal to the determining device.

In operation, the determining device receives the image information and makes the determination as to whether it represents the image of the OMR sheet or not. The recognizing device recognizes a facsimile number and data designating information from the image when the determination is made that the signal represents the image of OMR sheet. The information delivering device prepares an image signal of the data on the basis of the data designating information and transmits the image signal of the data to a destination designated by the facsimile number by means of the facsimile device.

Accordingly, by only entering the data information designating desired data and a facsimile number of a desired destination in an OMR sheet, converting image of the sheet the same into an image signal and applying the converted signal to the determining device, the electronic filing apparatus automatically executes a series of processings from the preparation of the data to the transmission thereof. There is no need for an operator to intervene. Accordingly, it is possible to provide an electronic filing apparatus operating efficiently.

Preferably, image information of the OMR sheet is transferred from a facsimile device in a distant place. Accordingly, an user in the distant place can obtain desired data directly from the electric filing apparatus without intervention of an operator. There is no need for instructing the operator in order to specify the data through a telephone, whereby no misunderstanding is produced in communication with the operator. Accordingly, there is no possibility of sending undesired data by means of a facsimile device, and a time period required for searching the electronic filing apparatus for the data is reduced. The efficiency is improved in using the apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view of an example of an OMR sheet employed in the electronic filing apparatus according to the present invention.

FIGS. 6-9 are flow charts of program to be executed in the CPU according to the second embodiment of the present invention.

DESCRIPTION OF THE PREFERRED EMBODIMENTS

Hereinafter, "primary information" means the image data themselves of the documents, and "secondary information" means such textual information related to and to be given to the primary information for the purpose of the retrieval of the primary information.

Figure 1:
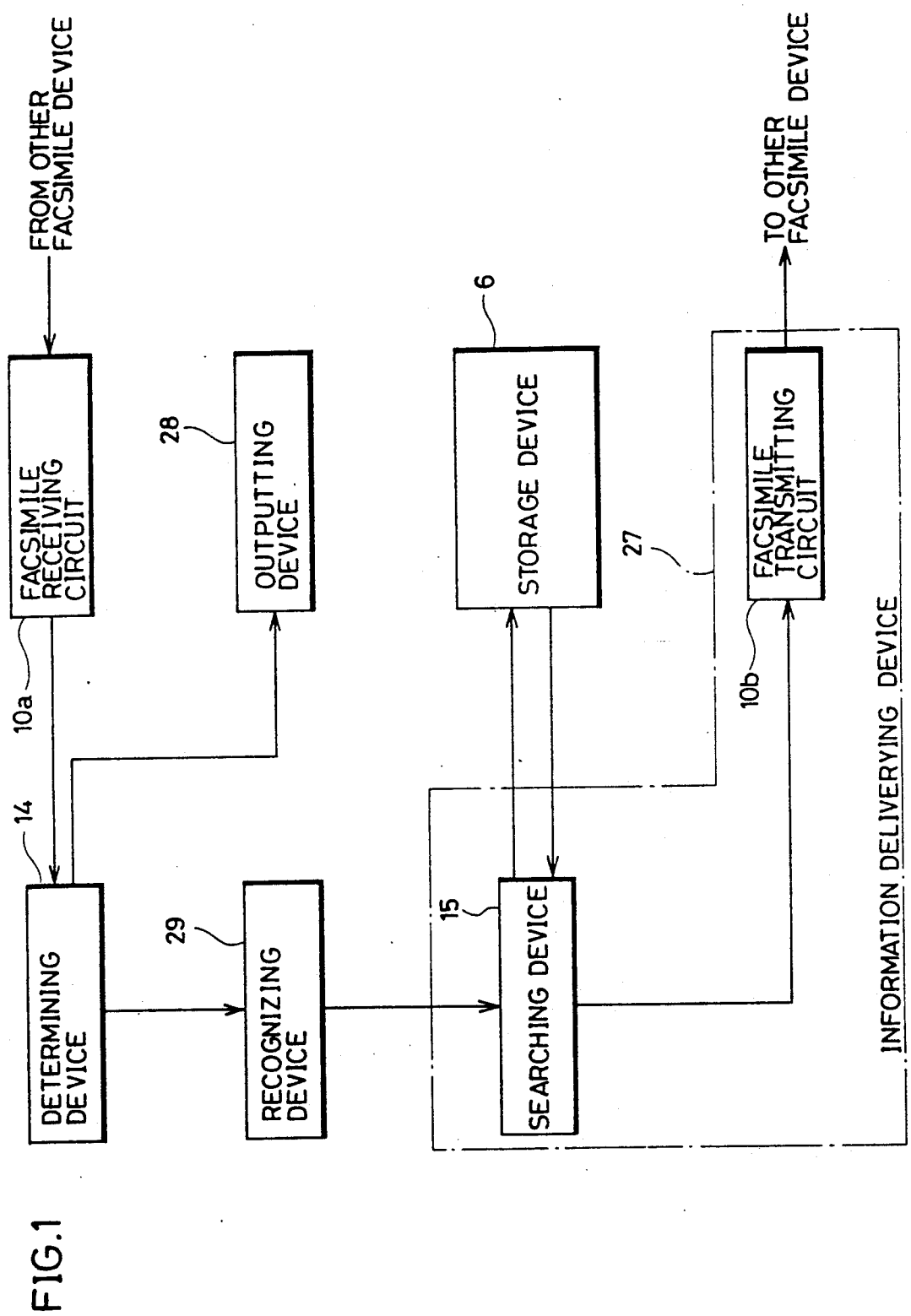
FIG. 1 is a block diagram of an electronic filing apparatus according to the present invention.

Referring to FIG. 1, an electronic filing apparatus according to a preferred embodiment of the present invention includes: a facsimile receiving circuit 10a for receiving an image signal from other facsimile device connected through a public communication network; a determining device 14 for making the determination as to whether the image signal received by the facsimile receiving circuit 10a represents image of an OMR sheet 16 shown in FIG. 2 or not; an outputting device 28 including a printer or the like for outputting image determined not to be of the OMR sheet 16 by the determining device 14; a recognizing device 29 connected to the determining device 14 for recognizing, from the image signal of the OMR sheet 16, such data as a facsimile number and secondary information; a storage device 6 in which image information of a large number of data are previously stored, and an information delivering device 27 connected to the recognizing device 29 and the storage device 6 for searching the storage device 6 to retrieve the designated data on the basis of the secondary information recognized by recognizing device 29 and for transmitting the obtained image signal to another facsimile device in accordance with the facsimile number recognized by the recognizing device 29.

The information delivering device 27 includes a searching device 15 connected to the recognizing device 29 for searching the stored data and for extracting the image signal of the designated information by utilizing the secondary information recognized by the recognizing device 29 as a key word or a key, and a facsimile transmitting circuit 10b for transmitting, through a public communication network, the image signal extracted by the searching device 15 from the storage device 6 to a destination having the facsimile number designated by the OMR sheet.

Referring to FIG. 2, the OMR sheet 16 employed in the present embodiment has timing marks 17 provided in an outer peripheral portion of a surface thereof for indicating a readable region. The timing marks 17 surrounds and thereby define a region 18 for designating various information which is to be secondary information.

The timing marks 17 are formed spaced apart from each other at a predetermined interval in a raw direction (X direction) and a column direction (Y direction) corresponding to locations of the blanks to be marked in the region 18.

Provided in an upper part of the region 18 are a field 19 for designating a type of processings, a field 20 indicating the date of registration of data, and a field 21 for designating a validity term of the stored information of the documents by a number of months. information for processing the data.

Provided in a middle part of the region 18 are a field 22 indicating a registration number of data in the registering the data and a field 23 indicating a facsimile number for use in transmitting the data by means of the facsimile device. The field 23 has blanks each provided for the entry of a mark such that one of the numerals 0-9 can be selected for each figure of a facsimile number of the destination.

Provided in a lower part of the region 18 are a field 24 for designating the number of original sheets in the registering the data, a field of 25 for setting a scanner to operate in a certain mode (scanner mode) in reading, and a field 26 for designating key words for use in retrieving the registered information.

The user enters marks in predetermined fields of the respective fields 19-26 depending on a kind of data. The user enters a mark as "[-]" in a mark position shown by "[]".

By reading the marked position, information can be obtained including type of processings as to whether the data is to be searched, registered or processed otherwise, and as to conditions for the search. The marked position are read in such a manner as disclosed in, for example, Japanese Patent Laying-Open No. 59-205678.

For example, in FIG. 2, the facsimile number is "112-345-7220" and the registration date is "Aug. 31, 1988".

In operation, the facsimile receiving circuit 10a receives an image signal from a facsimile device in a distant place through a public communication network. The facsimile receiving circuit 10a applies the received image signal to the determining device 14.

The determining device 14 makes the determination as to whether or not the image signal applied from the facsimile receiving circuit 10a represents image of the OMR sheet. Determination is made by sensing whether or not peripheral region of the image has timing marks 17. The determining device 14 prints the image signal determined as not representing the image of the OMR sheet 16 through the outputting device 28. The determining device 14 applies the image signal determined as representing the image of the OMR sheet 16 to the recognizing device 29.

The recognizing device 29 extracts types of processings, conditions in searching the data and other information and applies the same to the searching device 15.

The searching device 15 searches the storage device 6 in accordance with the designated searching condition when "search" is selected among the types of the processings. When the storage device 6 stores an image signal of the desired data, the searching device 15 applies the image signal to the facsimile transmitting circuit 10b.

The facsimile transmitting circuit 10b transmits the image signal of the data obtained by the searching device 15 to the destination having the facsimile number recognized by recognizing device 29 through the public communication network.

Through the above-described operations, a user can easily obtain a desired information without the operator's intervention. The user is required, for example, merely to mark the OMR sheet to indicate the facsimile number installed where the user is, to designate necessary information in order to specify the desired documents, and to feed the same OMR sheet to the facsimile transmitter and transmit the same to the electronic filing apparatus.

Figure 3:
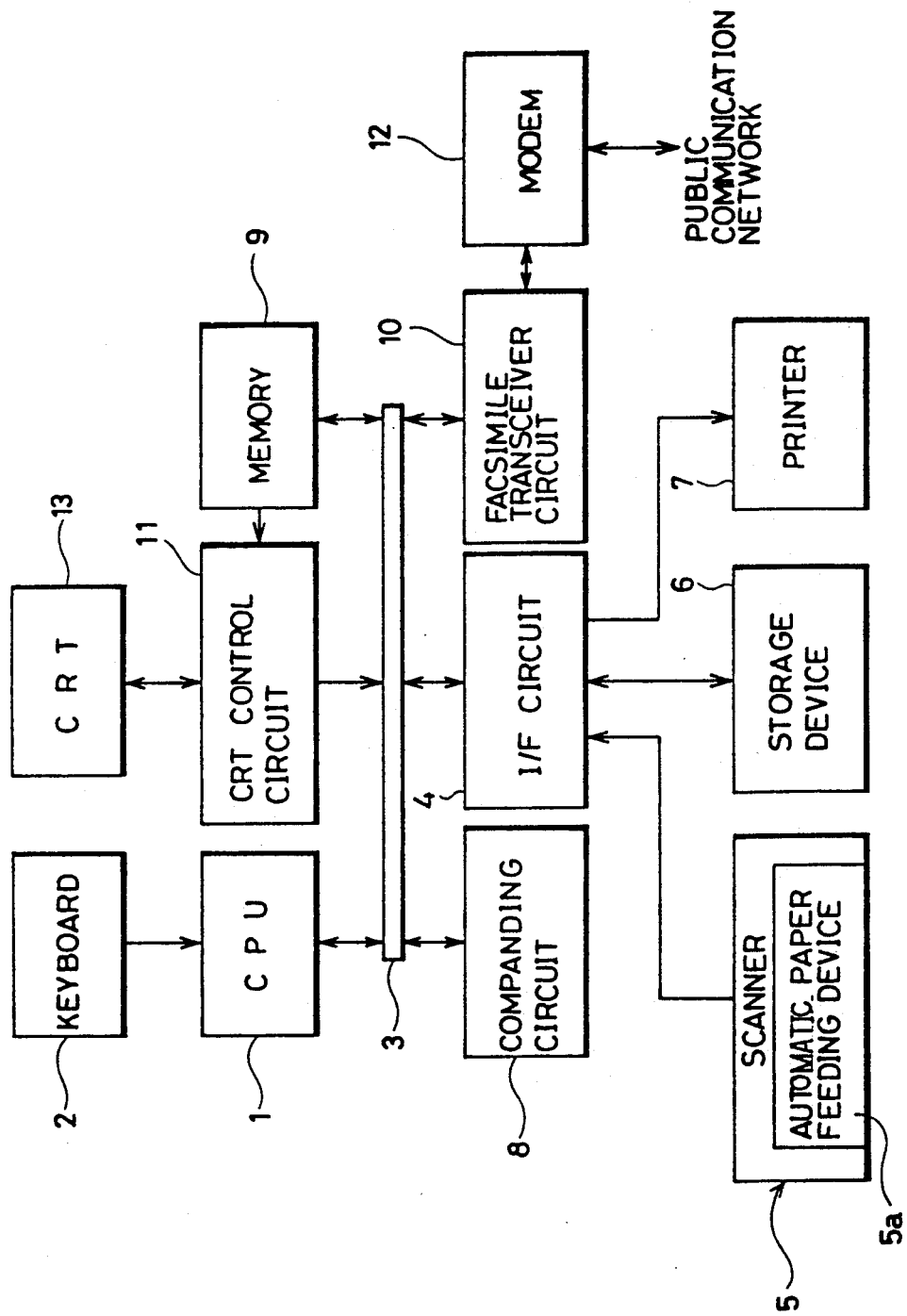
FIG. 3 is a circuit block diagram of an example of an implementation of an electronic filing apparatus according to a first embodiment of the present invention by using CPU.

FIG. 3 is a block diagram of an example of an implementation of electronic filing apparatus according to the first embodiment of the present invention by using a CPU. Referring to FIG. 3, the electronic filing apparatus includes a CPU 1 for controlling the entire apparatus, a keyboard 2 for the use of an operation in applying required information to the CPU 1, a host bus 3 connected to CPU 1, an interface (I/F) circuit 4 connected to the host bus 3 for connecting CPU 1 and peripheral devices, a scanner 5 connected to interface circuit 4 for automatically reading originals, a storage device 6 connected to interface circuit 4 and including an optical disc or the like, a printer 7 connected to interface circuit 4 for printing the information, a CRT 13 connected to host bus 3 through CRT control circuit 11, a memory 9 connected to host bus 3 and CRT control circuit 11 for temporarily storing primary information, secondary information and other data in such processings as registration and search, and sending data to a designated portion in response to the instructions of CPU1, a facsimile transceiver circuit 10 connected to host bus 3 and a public communication network through a modem 12 for transmitting and receiving image to and from the other facsimile device (not shown), and a companding circuit 8 connected to host bus 3 for compressing an image signal when the image signal is recorded in the storage device 6 and for expanding the image signal when the same is read out from the storage device 6.

Scanner 5 includes an automatic paper feeding device 5a for automatically feeding data printed in a plurality of pieces of paper to scanner 5.

The program executed in CPU 1 functions as determining device 14, recognizing device 29 and searching device 15 shown in FIG. 1.

Figure 4:
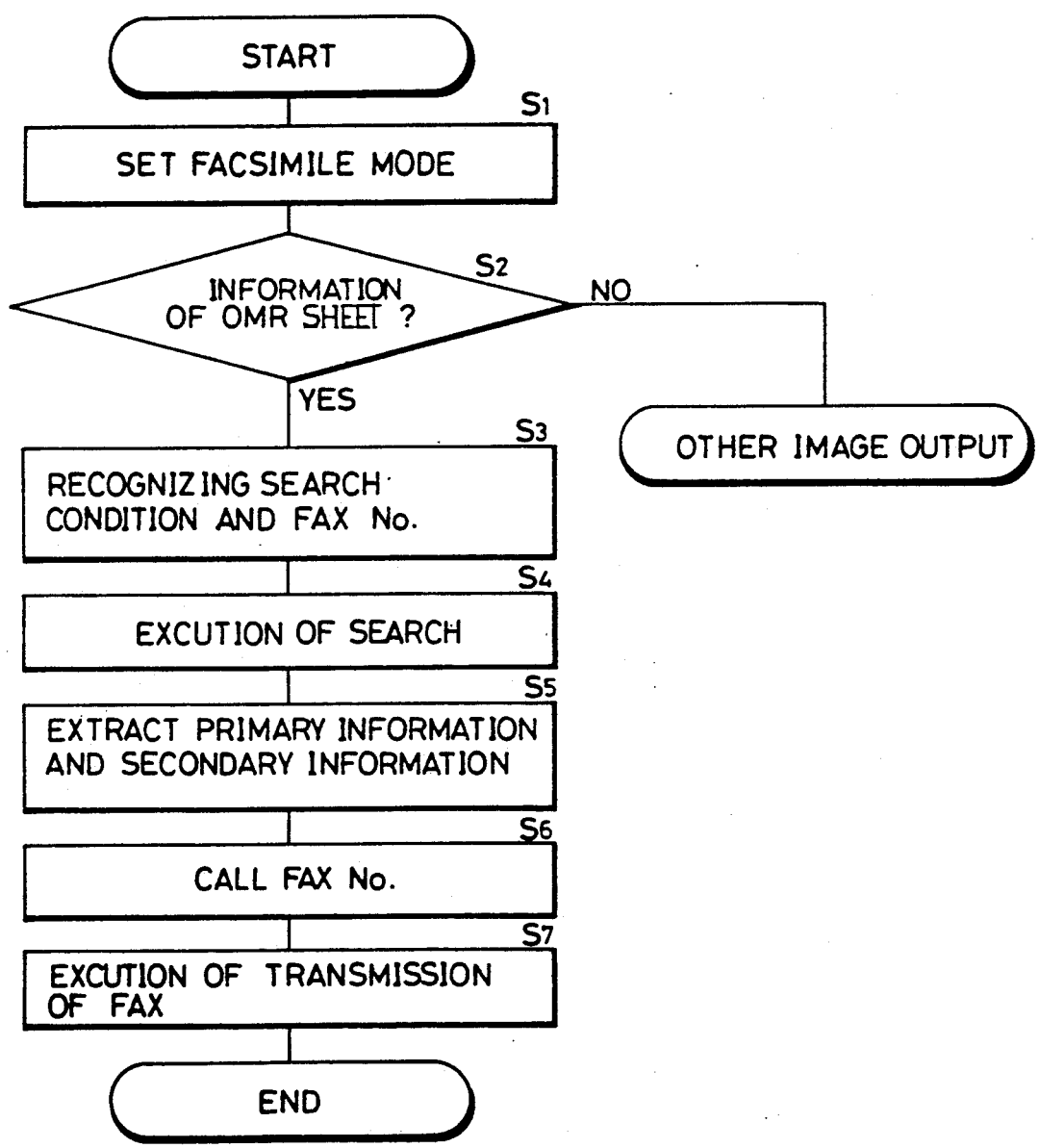
FIG. 4 is a flow chart of program to be executed in the CPU according to the first embodiment of the present invention.

Referring to FIG. 4, the electronic filing apparatus operates as follows when preparing information on the basis of instructions of OMR sheet 16 transmitted from a distant place and transmitting, in reply, the prepared information to the distant place.

In step S1, a body of the electric filing apparatus is set to operate in a facsimile mode so as to receive externally transmitted facsimile.

The facsimile transceiver circuit 10 receives an image signal from a facsimile device of the other party (not shown) through the modem 12 and the public communication network. Facsimile transceiver circuit 10 temporarily stores the received image signal in memory 9.

In step S2, determination is made as to whether or not the received image stored in memory 9 represents image of OMR sheet 16. If the result of the determination is NO, the image stored in memory 9 is transmitted through interface circuit 4 to printer 7 whereby the image is printed. If the result in step S2 is YES, the control moves to step S3.

In step S3, CPU 1 recognizes a search condition of the documents and the facsimile number entered in OMR sheet 16. As described above this recognition is made according to the known art.

In step S4, CPU 1 gives the searching condition to storage device 6 through interface circuit 4. Storage device 6 searches inside of itself based on the search condition applied from CPU 1.

In step S5, storage device 6 extracts primary and secondary information of the documents agreeing with the designated searching condition.

In step S6, a terminal having the facsimile number recognized in step S3 and the transceiver circuit 10 are connected through modem 12 and the public communication network.

In step S7, the primary and secondary information extracted from storage device 6 is transmitted to the destination facsimile device (not shown) through facsimile transceiver circuit 10, modem 12 and public communication network.

The processing based on the received OMR sheet is finished when the transmission is terminated.

As described above, the destination facsimile number and the search information for searching the documents are extracted from OMR sheet 16 transmitted from the destination facsimile device. Storage device 6 is searched based on the extracted search information to extract required primary and secondary information. The extracted primary information is transmitted to the destination of the facsimile number entered in OMR sheet 16 by means of the facsimile device. Therefore, the user can easily obtain necessary information stored in the electronic filing apparatus by using the facsimile device even from the outside of his office. There is no need for an operator to intervene.

Figure 5:
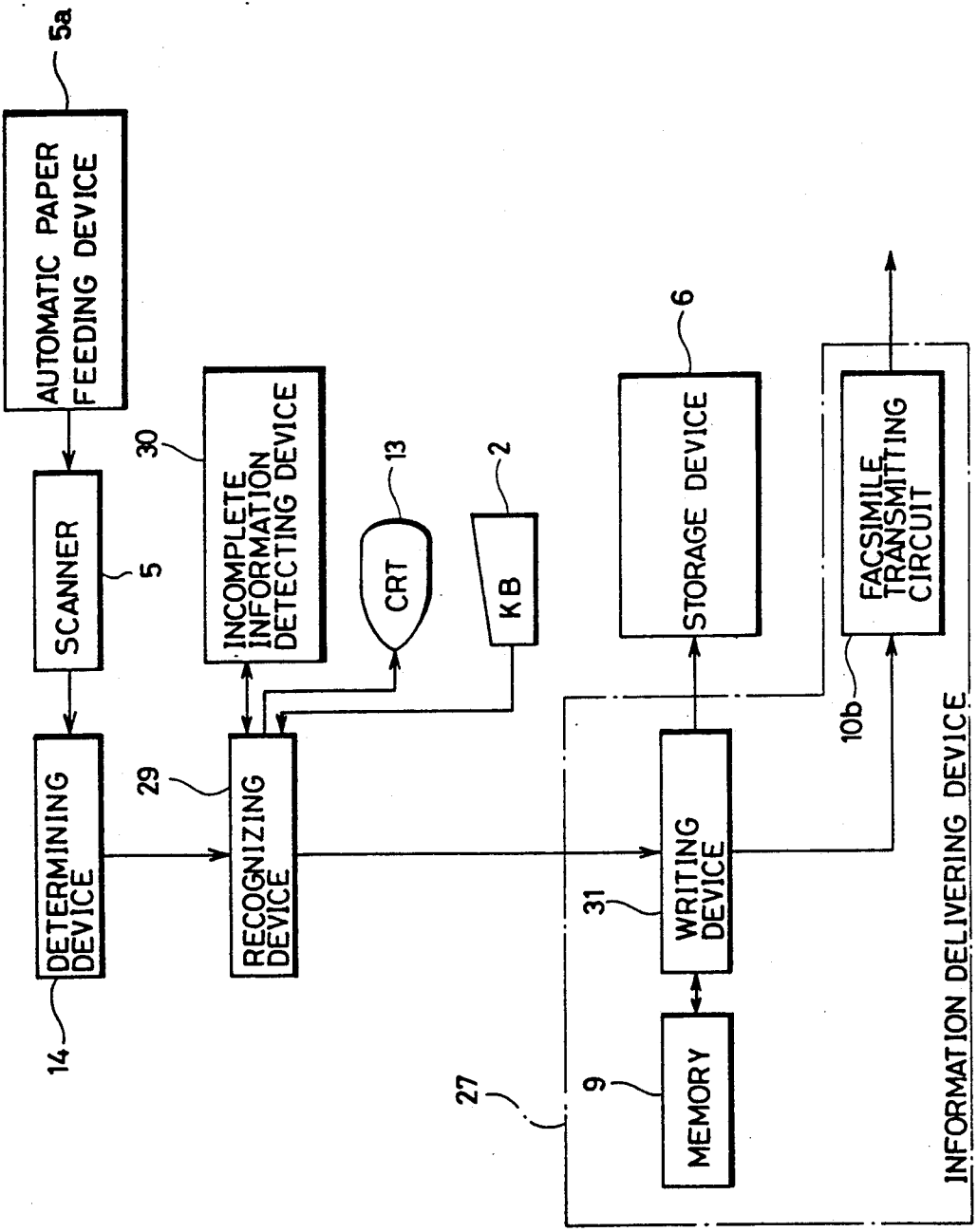
FIG. 5 is a block diagram of an electronic filing apparatus according to a second embodiment of the present invention.
Figure 6:
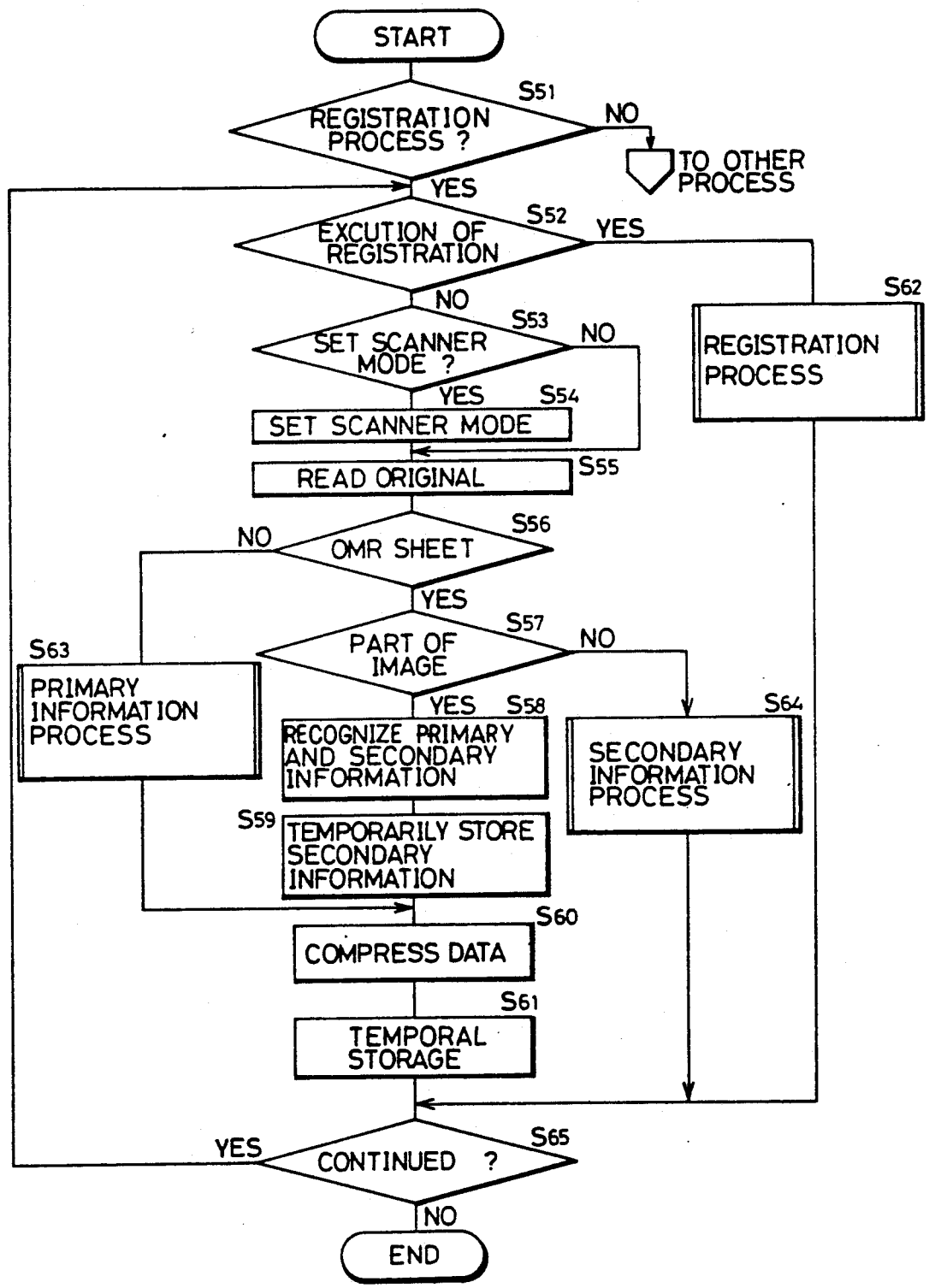

FIG. 5 is a block diagram showing a structure of the electronic filing apparatus according to the second embodiment of the present invention. The electronic filing apparatus shown in FIG. 5 is for optically reading the OMR sheet and data to be registered as well by the scanner and storing the same in the storage device and also for transmitting the data to the destination designated by the facsimile number.

With reference to FIG. 5, the electronic filing apparatus includes a scanner 5 for optically reading image formed on paper, an automatic paper feeding device 5a for automatically feeding sheets of paper one by one to scanner 5, determining device 14 for making the determination as to whether or not an image signal applied from scanner 5 represents image of an OMR sheet, a recognizing device 29 for recognizing various information entered in the OMR sheet with respect to the image signal determined as representing the image of the OMR sheet by determining device 14, an incomplete information detecting device 30 for detecting whether or not the information recognized by recognizing device 29 is complete, a CRT 13 for indicating to an operator detection of the incomplete information when incomplete information is detected by device 30, a keyboard 2 of the use of an operator to supplement the incomplete information, a storage device 6 for storing the image signal of the data read by scanner 5, an information delivering device 27 connected to recognizing device 29 and storage device 6 for causing storage device 6 to store the image signal of the documents based on the information recognized by recognizing device 29 and for transmitting the image signal read by scanner 5 to the destination with the facsimile number designated by the OMR sheet.

Information delivering device 27 includes a memory 9 for temporarily storing the image signal read by scanner 5, a writing device 31 for appending the information designated by the OMR sheet and the information inputted by the operator through keyboard 2 to the image signal stored in memory 9 and for supplying the same to storage device 6 to store the same therein, and a facsimile transmitting circuit 10b for transmitting the image signal stored in memory 9 to a destination of the facsimile number entered in the OMR sheet and recognized by recognizing device 29 through a public communication network.

With reference to FIG. 5, the electronic filing apparatus according to the second preferable embodiment of the present invention operates as follows. The operator puts the documents to be registered and OMR sheet 16 with secondary information concerning the documents and a destination entered therein on the automatic paper feeding device 5a. OMR sheet 16 is put on top of the documents.

Scanner 5 receives the paper from automatic paper feeding device 5a, reads image thereof one by one and applies the same to determining device 14.

Determining device 14 makes the determination as to whether the image applied from scanner 5 represents the image of the OMR sheet or not.

Recognizing device 29 recognizes the entered facsimile number and primary information with respect to the image signal determined as representing the image of the OMR sheet by determining device 14.

Incomplete information detecting device 30 inspects the secondary information recognized by recognizing device 29 to determine whether there is a defect or not. In case the secondary information is incomplete, recognizing device 29 displays a message thereof on CRT 13. The operator inputs the secondary information through a keyboard 2 in response to the message.

Recognizing device 29 reads the data by means of scanner 5 in accordance with the number of paper entered in OMR sheet 16 and applies the image signal, together with the secondary information obtained from OMR sheet 16, to writing device 31.

Writing device 31 temporarily stores the image signal applied from recognizing device 29 in memory 9. Writing device 31 compresses the image signal stored in memory 9 and writes the compressed image signal in storage device 6. At the same time, writing device 31 transmits the image information written in memory 9 to the destination facsimile number designated by the recognizing device 29, through facsimile transmitting circuit 10b.

The electronic filing apparatus operates as described above. Accordingly, with the facsimile number of the destination entered in OMR sheet, the processings, from the reading of the data by scanner 5 to the transmission of the data to the destination by facsimile transmitting circuit 10b are automatically performed. As long as the information entered in the OMR sheet is complete, the operator does not need to intervene to operate the electronic filing apparatus. In addition, since the facsimile transmission and the storing in the device 6 of the image signal of the documents are carried out simultaneously, there is no need to search the image signal just stored in storing device 6. Therefore, a time required for the processing, from reading the original to sending the same to the destination, can be reduced.

FIGS. 6-9 are flow charts of a program executed in CPU 1 when the electronic filing apparatus according to the second embodiment is implemented by the electronic filing apparatus having the circuit block diagram shown in FIG. 3.

With reference to FIGS. 3, and 6 through 9, the electronic filing apparatus of the second embodiment operates as follows.

In step S51, the operator selects a registration process by using keyboard 2. When the operator selects other process than the registration process, the flow branches to a routine of executing the selected process.

In step S52, determination is made as to whether the stage of executing registration of the documents is reached or not. If the answer is YES, the control proceeds to step S62. If the process does not reach the stage of executing the registration, that is, if the answer of the determination in step S52 is NO, the control proceeds to step S53.

In step S53, determination is made as to whether the scanner is to be set to operate in a different mode or not. If the answer is YES, the control proceeds to step S54, wherein the scanner is set to operate in a certain mode. The scanner mode set in step S54 includes designation such as density, a size of the original and other specifications.

If the answer of the determination in step S53 is NO, the processing in step S54 will be omitted.

The control proceeds to step S55. In step S55, image of one original is read by scanner 5.

In step S56, CPU 1 determines whether the read image represents the image of OMR sheet or not. If the answer of the determination is YES, the control proceeds to step S57. Else it proceeds to step S63.

In step S57, determination is made as to whether the image of the OMR sheet includes image other than the secondary information or not. It should be noted that a region in which the image is to be formed is not illustrated in OMR sheet 16 shown in FIG. 2. If the answer of the determination in step S57 is No, the control proceeds to step S64. Else it proceeds to step S58. Referring to FIG. 2, OMR sheet 16 according to the present embodiment has no image forming region provided. Accordingly, the control proceeds to step S64.

Referring to FIG. 8, when the control proceeds to the secondary information processing routine, the secondary information entered in OMR sheet 16 is recognized by CPU 1 in step S119.

In step S120, the secondary information recognized by CPU 1 is stored in memory 9. The secondary information includes such information as to type of process, for example, registration of the data in storage device 6 or retrieval of the data from storage device 6, and a facsimile number of a destination.

In step S121, determination is made as to whether the read secondary information includes the mode information of scanner 5 or not. If the answer of the determination is YES, the control proceeds to step S122 and otherwise it returns to the main routine, omitting the process from step S122 to S125.

In step S122, the scanner mode information already set is called, whereby the scanner mode is reset.

In step S123, determination is made as to whether information on the number of sheets to be read is entered in OMR sheet 16. If the answer of the determination is YES, the control proceeds to step S124, and otherwise it returns to the main routine.

In step S124, the information on the number of sheets to be read is temporarily stored in memory 9.

In step S125, the count of the number of scanned sheets is reset to zero. After step S125, the control returns to the main routine.

If the answer of the determination is YES in step S57, the control proceeds to step S58. This routine corresponds to a case wherein image which becomes the primary information is formed on the OMR sheet together with the secondary information. In step S58, the primary and secondary information read from the OMR sheet is recognized by CPU 1.

In step S59, the recognized secondary information is temporarily stored in memory 9.

Subsequently, in step S60, the read image data is compressed. In step S61, the compressed image data is temporarily stored in memory 9.

Subsequently, the control proceeds to step S65. In step S65, determination is made as to whether the process should be continued or not. If the answer is YES, the control returns to S52, and otherwise the program finishes. Since the processing does not ordinarily finish by the reading of the OMR sheet, the control returns to step S52.

Again in step S52, determination is made as to whether registration should be executed or not. If the number of originals to be read by the secondary information is designated, and if the number of the read original and the designated number of originals do not match with each other yet, the control proceeds to step S53.

In steps S53 and S54, the scanner mode is reset if necessary.

In step S55, a subsequent original is read by scanner 5.

In step S56, determination is made as to whether the read original represents the image of the OMR sheet or not. Because the OMR sheet is already read, and the original being read now is the original of the data to be stored in storage device 6, the answer of the determination in step S56 will be NO, thereby the control proceeds to step S63. In step S63, the primary information is processed.

With reference to FIG. 7, first in step S107, the primary information is recognized by CPU 1 in the subroutine of the primary information processing.

In step S108, determination is made as to whether the information on the number of the read paper has been designated by the OMR sheet or not. If the answer is YES, the number of paper to be read is counted in step S109. Otherwise the processing in step S109 is omitted.

In step S110, determination is made as to whether the read original is the last page or not. If the answer is YES, the counted number of read paper and the information in the number of paper to be read given by the secondary information are compared with each other in step S111. In step S112, determination is made as to whether the number of the read paper and the information of the number on read paper given by the secondary information agree with each other or not. If the answer is YES, the sub-routine returns, and otherwise the control moves to the error processing because of disagreement of the number of originals.

If the answer of the determination in step S110 is NO, process in steps S111 and S112 is omitted, whereby the control returns directly to the main routine.

The control further proceeds to steps S60 and S61, wherein the primary information is data-compressed by companding circuit 8 and temporarily stored in memory 9.

Thereafter, the control returns from step S65 to step S52 again.

When the original has a plurality of pages, process from the reading of the original in the above described step S55 to temporal storing of the data in step S61 is repeated. When the process with respect to all the pages is finished and the control returns to step S52, the answer of the determination in step S52 becomes YES.

Figure 9:
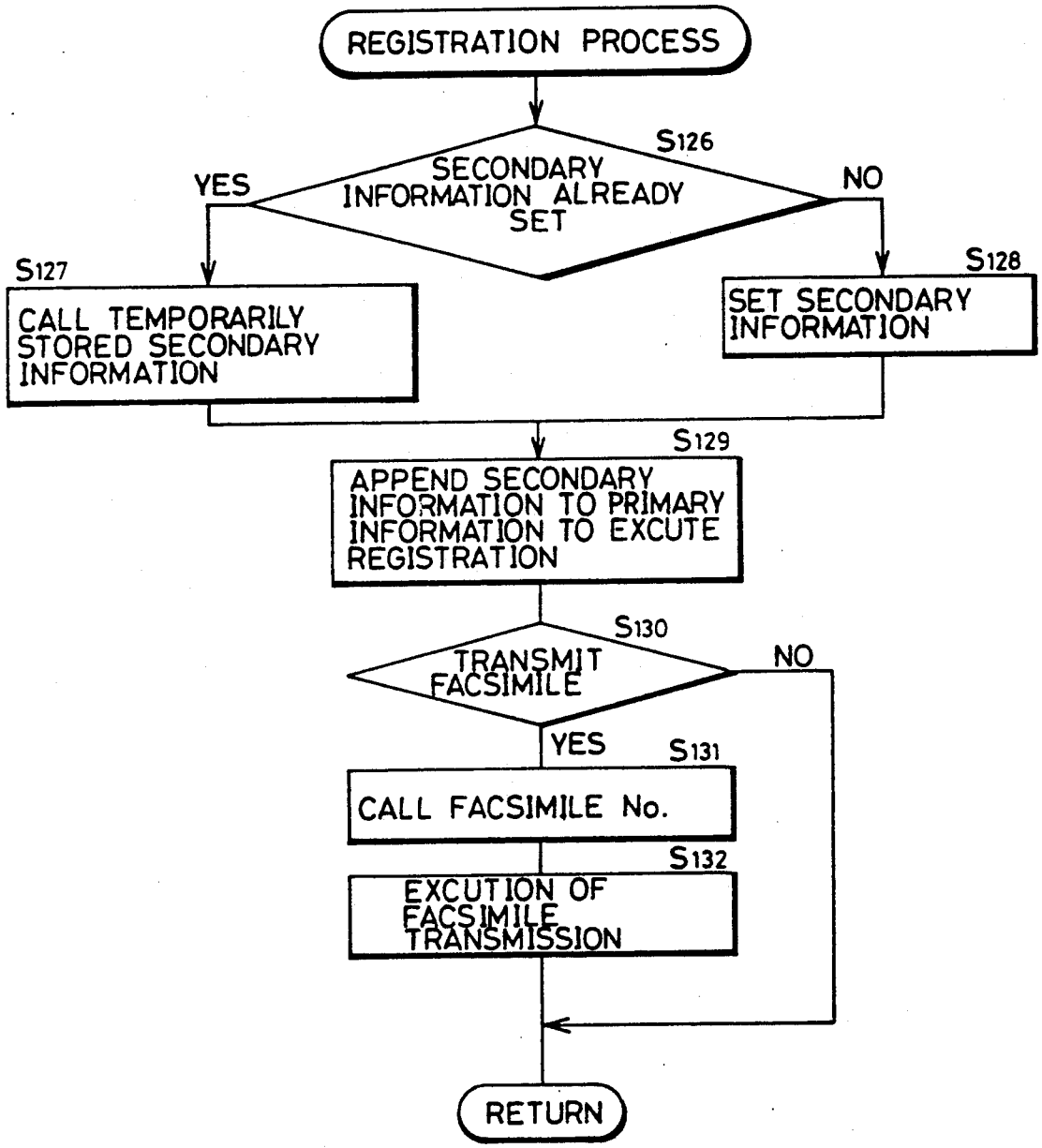

The control proceeds to step S62. With reference to FIG. 9, determination is made as to whether all of the necessary secondary information is already set or not in step S126 of the registration process sub-routine. If the answer of the determination is YES, the control proceeds to step S127, and otherwise it proceeds to step S128.

In step S128, the program displays a message that the secondary information should additionally set on CRT 13. The operator inputs the necessary secondary information from keyboard 2 in response to this message.

In step S127, the temporarily stored secondary information is read out. After steps S127 and S128, the control proceeds to step S129. In step S129, the secondary information called in step S127, or the secondary information set in step S128 is appended to the primary information. The primary information with the appended secondary information is applied to storage device 6 through interface circuit 4, whereby storage device 6 stores the given information.

In step S130, determination is made as to whether the facsimile number is stored or not. If the answer is NO, the control returns to the main routine. If the answer is YES, the facsimile number is called in step S131.

In step S132, the secondary information and the primary information temporarily stored in memory 9 is transmitted to the destination designated by the called facsimile number through facsimile transceiver circuit 10, modem 12 and public communication network.

At the end of the registration process in step S62, the control returns to step S65 in the main routine. If no data follows, the program finishes. Otherwise, the control returns to step S52 again, whereby the same process as described above is repeated.

Execution of the program having the above-described flow chart in CPU 1 enables transmission of the image signal of the data just registered in storage device 6 to the destination designated by the OMR sheet. In this case, time for newly searching a storage device 6 can be saved by directly transmitting the data from memory 9. Similarly, if the address is stored when the image signal of the documents is stored in the storage device 6, the time for searching the storage device 6 becomes unnecessary by directly reading the signal from the storage address at the time of the transmission. Accordingly, in case of transmitting the data to another facsimile device simultaneously with the registration of the data in storage device 6, the process can be executed in a short time. In addition, if the secondary information is completely entered in the OMR sheet beforehand, the intervention of the operator becomes unnecessary. Accordingly, the electronic filing apparatus can be used efficiently.

In the above-described embodiments, facsimile is transmitted immediately after the registration, for each data set designated by a piece of OMR sheet. However, the present invention is not limited thereto, and image of the original may be transmitted each time one page of the original is read. Furthermore, in case of a plurality of groups are to be transmitted each containing an OMR sheet and documents, all groups may be successively registered, so that after the registration of all the groups, facsimile of each group may be separately and sequentially transmitted to a destination designated by the OMR sheet for each group. In this case, at the time of the registration, storage address of each group in storage device 6 and the facsimile number of the destination may be temporarily stored in memory 9, so that at the time of facsimile transmission, data can be directly read from the stored address of storage device 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic filing apparatus comprising:
    determining means for receiving an image signal to determine as to whether image represented by said image signal is image of an OMR sheet according to a predetermined form or not,
    said predetermined form at least including a field to fill in with a facsimile number and a field to fill in with data designating information for designating desired data,
    recognizing means for recognizing said facsimile number and said data designating information from said image signal determined by said determining means as a signal representing the image of said OMR sheet; and
    information delivering means for retrieving prepared data designated by said recognized data designating information and for transmitting the image signal of said prepared data to an output destination designated by said recognized facsimile number by means of a facsimile device.

2. The electronic filing apparatus according to claim 1, further comprising facsimile receiving means adapted to be connected to a facsimile transmitting device through a communication line for receiving said image signal from said facsimile transmitting device and applying the image signal to said determining means.

3. The electronic filing apparatus according to claim 2, wherein said apparatus is adapted to be connected to storing means for storing image information of data, and wherein
    said information delivering means comprises:
        searching means for searching said storing means to retrieve image information of said prepared data, based on image designating information recognized by said recognizing means, and
        facsimile transmitting means for transmitting said image information of the data retrieved by said searching means to an output destination designated by said facsimile number.

4. The electronic filing apparatus according to claim 1, further comprising image outputting means for converting the image signal determined by said determining means as not representing the image of said OMR sheet into visual image and outputting the visual image.

5. The electronic filing apparatus according to claim 4, wherein said image outputting means comprises image printing means responsive to said image signal for forming said image on a predetermined medium.

6. The electronic filing apparatus according to claim 4, wherein said image outputting means comprises displaying means for visually reproducing the image represented by said image signal and displaying the visual.

7. The electronic filing apparatus according to claim 1, further comprising reading means for reading image formed on paper, converting said read image into said image signal and applying the converted image signal to said determining means.

8. The electronic filing apparatus according to claim 7, wherein said reading means comprises scanning means for scanning a surface of said paper on which said image is formed and for converting said image into a digital image signal.

9. The electronic filing apparatus according to claim 7, further comprising means for applying a plurality of pieces of paper to said reading means one by one.

10. The electronic filing apparatus according to claim 9, which is connected to storing means for storing image information of said plurality of data in a predetermined order, wherein
    said information delivering means comprises:
        means for temporarily storing image information read from said paper subsequent to reading information from said OMR sheet, on the basis of said data designating information recognized by said recognizing means,
        writing means for writing said temporarily stored image information in said storing means,
        facsimile transmitting means for transmitting said temporarily stored image information to the output destination designated by said facsimile number by means of the facsimile device.

11. The electronic filing apparatus according to claim 10, further comprising incomplete information detecting means for detecting whether said data designating information recognized by said recognizing means is incomplete or not.

12. The electronic filing apparatus according to claim 11, further comprising incomplete information supplementing means for supplementing said incomplete data designating information detected by said incomplete information detecting means.

13. The electronic filing apparatus according to claim 12, wherein said incomplete information supplementing means comprises,
    informing means for informing an operator of said detection of the incomplete information,
    data inputting means for the use of said operator to supplement said incomplete information.

* * * * *